Aug. 8, 1944.   H. R. FISCHER ET AL   2,355,520
COMPRESSION RIVETER
Filed June 6, 1941   6 Sheets-Sheet 2

INVENTORS
HOWARD R. FISCHER
JAMES A. ROBERTS
BY
Raymond G. Mullee
ATTORNEY

Aug. 8, 1944.      H. R. FISCHER ET AL      2,355,520
COMPRESSION RIVETER
Filed June 6, 1941      6 Sheets-Sheet 3

INVENTORS
HOWARD R. FISCHER.
JAMES A. ROBERTS.
BY
Raymond G. Mullee
ATTORNEY

Aug. 8, 1944. H. R. FISCHER ET AL 2,355,520
COMPRESSION RIVETER
Filed June 6, 1941  6 Sheets-Sheet 5

INVENTORS
HOWARD R. FISCHER
JAMES A. ROBERTS.
BY
Raymond G. Mullee
ATTORNEY

Patented Aug. 8, 1944

2,355,520

UNITED STATES PATENT OFFICE 2,355,520

COMPRESSION RIVETER

Howard R. Fischer and James A. Roberts, Detroit, Mich., assignors to Chicago Pneumatic Tool Company, New York, N. Y., a corporation of New Jersey Application June 6, 1941, Serial No. 396,880

4 Claims. (Cl. 78—48)

This invention relates to power operated compression machines for riveting and the like, and more particularly to tools of this class which are held in the hand of the operator when in use and applied manually to the work.

The ends to be attained in designing a tool of the kind above described are: that the tool shall be small, light in weight, easy to handle and simple in operation, and yet be sufficiently powerful in its action to perform effectively and quickly in the class of riveting and dimpling operations for which it is intended. It is believed that the tool of this invention possesses all of these qualities to a degree unequalled in the prior art, and it is the object of the invention to produce such a tool.

More specifically the invention contemplates the provision of a generally new tool having as a distinguishing characteristic a one-piece tubular casing which serves both as a handle for the tool and as a housing for the motor and work performing elements operated by the motor.

Another feature of the machine is an improved means for initiating and controlling operation of the motor, including a manipulative throttle control element located adjacent the front end of the tubular housing.

An additional feature is a short stroke mechanism by which movement of the work performing elements may be controlled independently of the motor.

Still another feature is a piston assembly, carrying a wedge which receives directly the thrust of the piston and yet is permitted a pivotal movement relatively thereto.

These and other structural features of novelty have been combined to produce a sturdy, efficient tool having a high degree of usefulness in the aircraft and allied industries. One commercial embodiment of the invention, weighing less than four pounds and having an over-all length of slightly more than nine inches, is capable of heading aluminum alloy rivets up to one-eighth inch in diameter.

Figure 1:
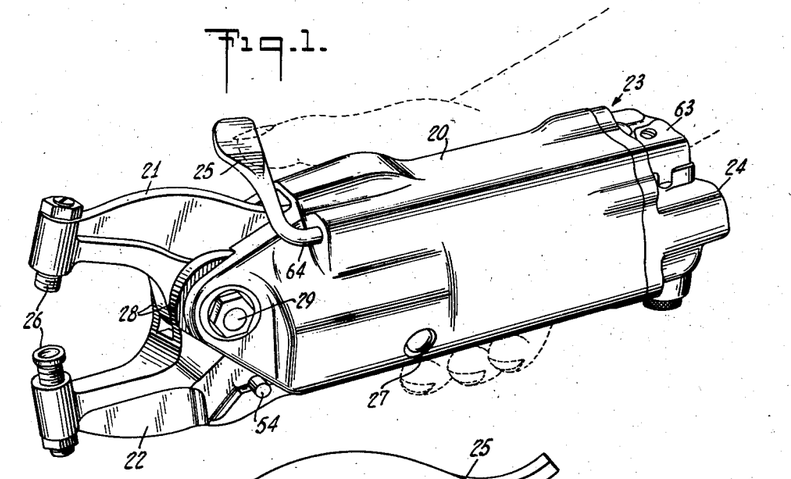
Fig. 1 is a perspective view of a tool for performing riveting and like operations, constructed in accordance with the principles of this invention.

Referring to Fig. 1, the device of the invention is seen to comprise a cylindrical housing 20 supporting a pair of relatively movable work performing jaws 21 and 22 at its forward end, and closed at the opposite end by a plate 23 constituting a back-head. The housing 20, which serves both as a cylinder and as a yoke, is preferably constructed as a one piece casting, made of a strong, durable and light-weight metal such as aluminum alloy or magnesium alloy. Pressure fluid operated means within the housing 20 effects relative movement of the jaws 21 and 22. The pressure fluid, for example compressed air, is directed to the tool through a hose line (not shown) adapted to be connected at 24 to the back-head 23. Under the control of valve mechanism embodied in the back-head, and including a throttle valve, the air is admitted to the interior of the housing 20. Operation of the throttle valve is accomplished manually by means including a lever 25 accessible for finger tip control at the front of the housing. The tool is free of the usual projecting handles, the cylindrical housing itself being shaped to fit within the supporting hand of the operator. As indicated in dotted outline in Fig. 1, in using the tool the cylindrical part of the housing 20 is grasped and supported by the fingers while the thumb is held in position to depress the lever 25. When so held the machine may be moved and applied to the work relatively to the pressure fluid source and operation thereof initiated without the necessity of shifting the hand from supporting position. Together, the work performing jaws 21 and 22 constitute what is known as an alligator type yoke. The jaws extend forwardly beyond the housing 20 and have oppositely disposed outer ends carrying complementary work engaging dies 26 (see also Figs. 3 and 6). In the illustrative embodiment, the dies 26 are in the form of adjustable rivet sets, but may be replaced by dies of other shapes for dimpling, punching, etc. Through actuation of the jaws the dies 26 are moved toward and from the position of cooperative relation shown in Figs. 3 and 6 to complete a cycle of operation and effect squeezing or dimpling of the work positioned between the jaws.

Figure 3:
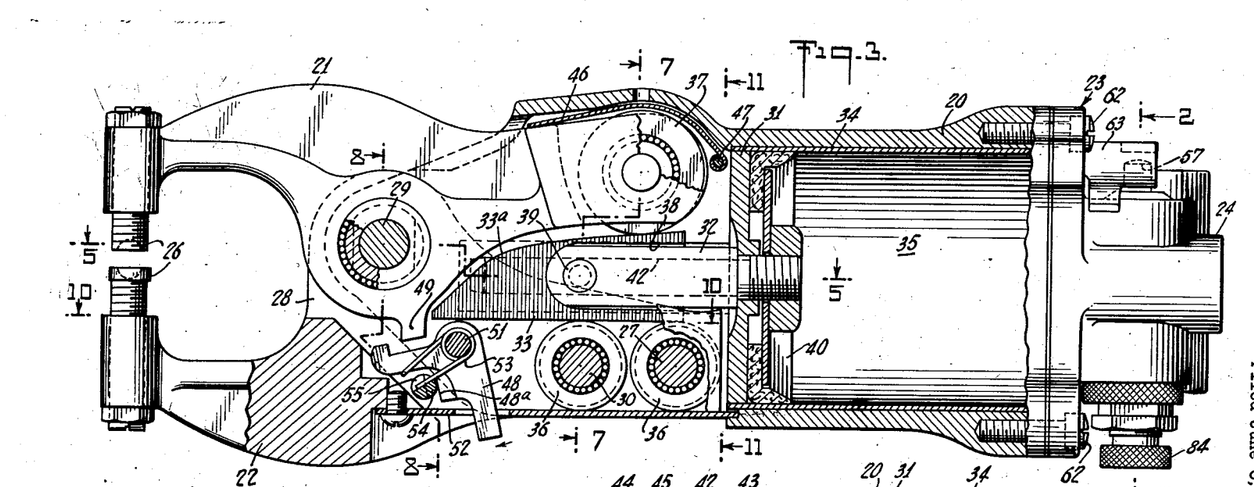
Fig. 3 is a view, in longitudinal section, of the tool shown in Fig. 1.
Figure 4:
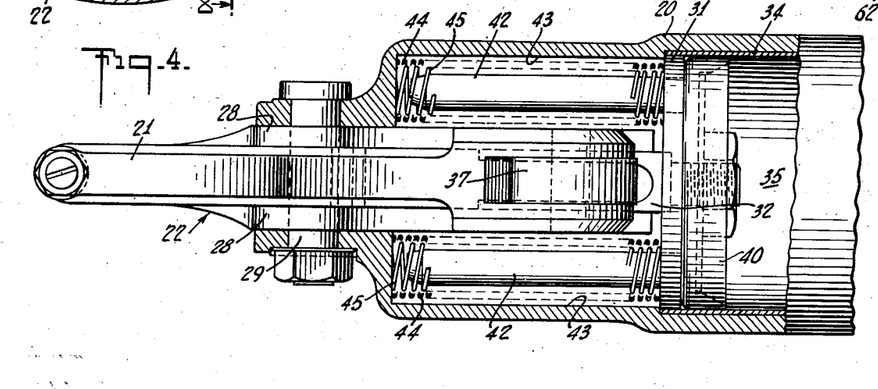
Fig. 4 is a fragmentary plan view of the tool, part of the housing being broken away to show the piston assembly in full.
Figures 5, 6, 7, 8, 9:
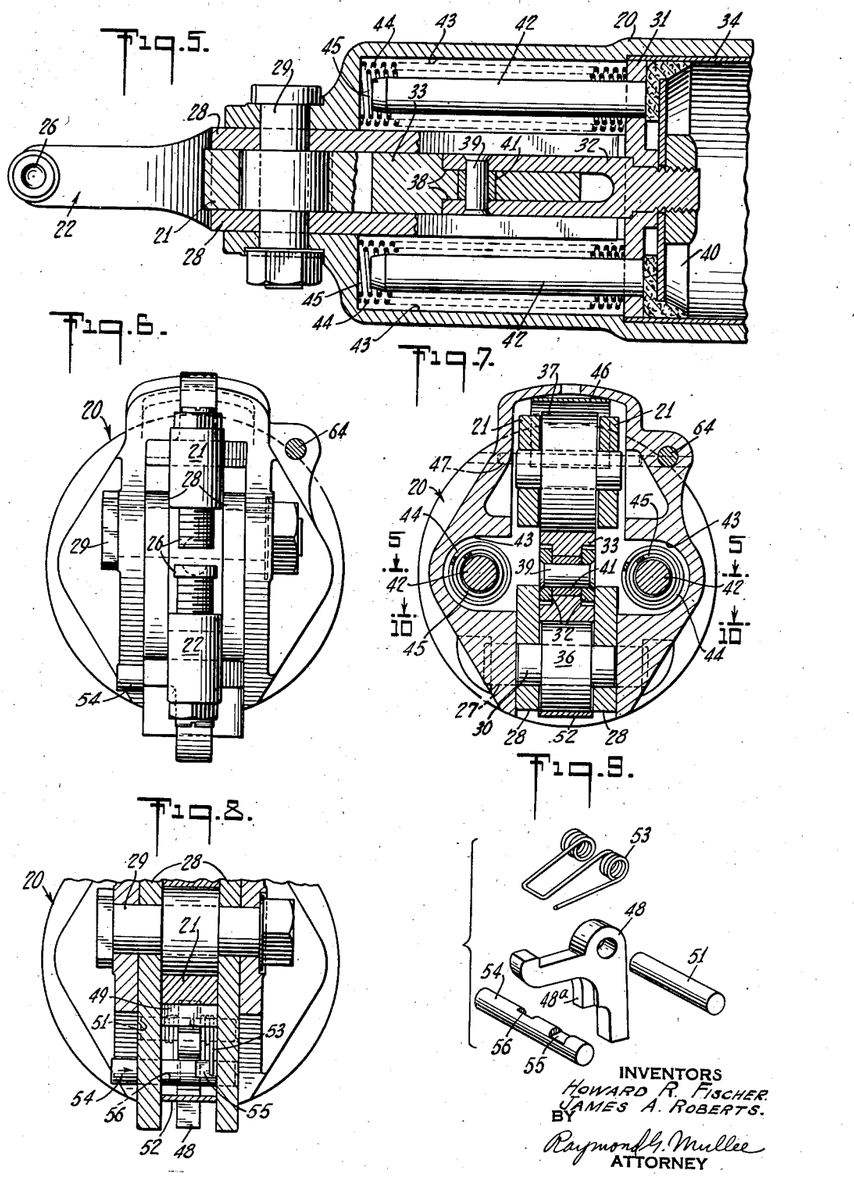
Fig. 5 is a fragmentary plan view, in longitudinal section, taken substantially along the line 5—5 of Fig. 3.
Fig. 6 is a front end view of the tool with the throttle control lever broken away.
Fig. 7 is a view, in cross section, taken substantially along the irregular line 7—7 of Fig. 3.
Fig. 8 is a fragmentary view, in cross section, taken through the short stroke mechanism substantially along the irregular line 8—8 of Fig. 3.
Fig. 9 is a detail view, in exploded isometric, of the short stroke mechanism.

To receive the inner ends of the jaws 21 and 22 the forward end of the cylindrical housing 20 is bifurcated to form projecting arms having parallel edges and tapering from a point of maximum width at their bases to a point of minimum width at their extreme front ends. The lower jaw 22 is positioned with its inner end between the projecting arms of the housing and is secured against relative movement by means including a bolt 27 passed transversely through the housing and inner end of the jaw. The jaw 22 is thus stationary and, as shown in Figs. 3 and 5, that portion thereof lying within the housing 20 is yoke shaped or bifurcated thereby forming a pair of arms 28. At the front end of the housing 20 the arms 28 take the shape of upright shoulders and gradually decrease in height as they extend rearwardly in the housing. The upright shoulders of the arms 28 are positioned within the extreme front end of the housing which is reduced in diameter at this point to receive the shoulders with a close fit. A bolt 29 extends transversely through the front of the housing and through the shoulders of the arms 28 and supplements the bolt 27 in holding the jaw 22 against movement. The upper jaw 21 also extends into the open front end of the housing 20 and is pivotally mounted on the bolt 29 between the arms 28 of the stationary jaw 22. The two jaws 21 and 22 are thus mounted in the same vertical plane (see Figs. 4 and 6) and are pivotally connected at approximately their midpoints, the upper jaw 21 being arranged for oscillating movement relative to the lower jaw and to the housing 20.

Figure 10:
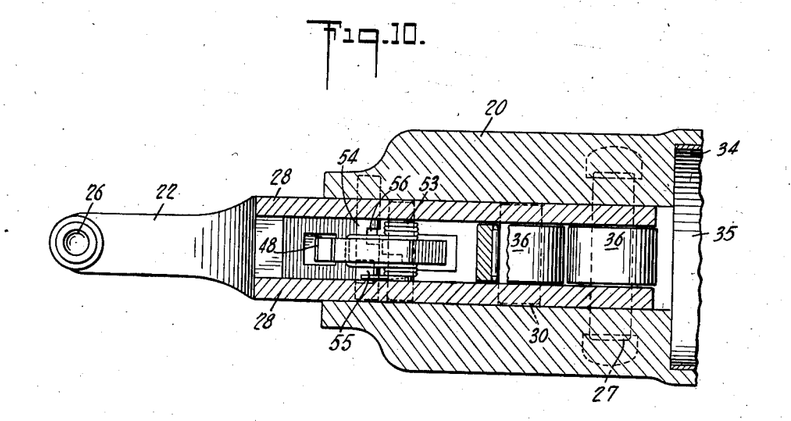
Fig. 10 is a fragmentary plan view, in longitudinal section, taken substantially along the line 10—10 of Fig. 3.
Figure 11:
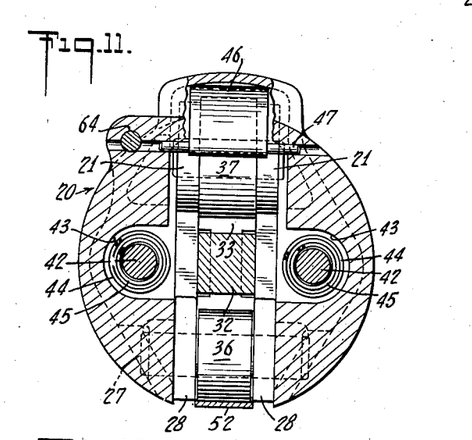
Fig. 11 is a view, in cross section, taken substantially along the line 11—11 of Fig. 3.

Referring to Fig. 3, the pressure fluid operated means within the cylindrical housing for actuating the movable jaw 21 takes the form of a piston assembly comprising a piston 31, a forwardly projecting piston rod 32 bolted to the piston, and a wedge 33 carried by the rod 32. The piston 31 has a sliding fit within a casing or liner 34 in the rearward portion of the housing, and forms in cooperation with the back-head 23 a compression chamber 35. Pressure fluid, introduced into the chamber 35 acts on the rear face of the piston 31 to drive the assembly, of which the piston is a part, forwardly in the housing. Cooperable with the wedge 33 are a pair of rollers 36, on stationary jaw 22, and a roller 37, on movable jaw 21. The rollers 36 are disposed about parallel axes between the stationary jaw arms 28 (see also Fig. 10), while the roller 37 is carried within the bifurcated inner end of jaw 21 (see Fig. 4) and overlies the rollers 36. One roller 36 is mounted on the bolt 27 while the other is supported by a shorter bolt 30 extending between the arms 28 and lying wholly within the housing 20. The wedge 33 is arranged to enter between the rollers 36 and 37 and is formed in a conventional manner with an inclined surface 33ª of varying steepness engaged by the roller 37. At the forward end of the wedge the surface 33ª is sharply inclined, in order that the movable jaw may be moved quickly from wide open position into contact with the work. Rearwardly of the sharply inclined front end thereof the upward slope of surface 33ª is more gradual with the result that the latter part of the compression stroke is accomplished more slowly and with a progressive multiplication of pressure. In actuating the movable jaw 21, the wedge 33 rides over the rollers 36 and is guided between the arms 28 of jaw 22 (see Figs. 7 and 11) in a path coaxial with the piston 31. The piston rod 32 may be formed integrally with the piston 31 or detachably secured thereto in the manner shown by screw thread and nut.

Figure 12:
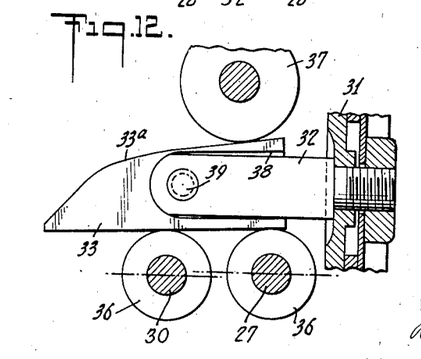
Fig. 12 is a detail view showing a portion of the piston assembly, including the wedge and follower rollers therefor, the pair of stationary rollers being shown misaligned to illustrate the manner in which the wedge adjusts itself to such errors independently of the piston proper.

The connection between the rod 32 and wedge 33 is preferably such as to permit a slight relative pivotal movement between the elements in order that the wedge may automatically adjust itself to machining errors, such as a slight misalignment of the rollers 36. In the present embodiment of the invention the piston rod is forked and receives the wedge 33 within the forked portion thereof. On opposite sides of the wedge recesses 38 are formed by a milling operation and into these recesses project the fingers which form the forked portion of the piston rod (see also Fig. 5). The bottoms of the recesses 38 are rounded and are engaged by the outer ends of the piston rod fingers, which have a complementary shape. A rivet or pin 39 is passed transversely through the forked portion of rod 32 and through wedge 33 and connects the elements in order that the wedge may be retracted during the return stroke of the piston 31. The connection established by the rivet 39 is not a rigid one since the wedge 33 engages the rivet indirectly through a loosely fitting bushing 41 (Fig. 5). As shown in Fig. 7, in a cross section taken through the recessed portion of the wedge 33, the wedge has the shape of an I-beam, filled out by the projecting fingers of the piston rod, which fingers are held by the rivet 39 in a central position within the recesses 38. The recesses 38 exceed the piston rod 32 in width and the resulting clearance space above and below the rod permits a pivotal movement of the wedge about the rivet 39. Fig. 12 is an illustrative example of the manner in which the wedge 33 adjusts itself to a misalignment of the rollers 36. In this figure the roller supporting bolts 27 and 30 are offset with respect to each other, the right hand or rearward bolt 27 being slightly higher than the bolt 30. As shown, in entering between the rollers 36 and 37 the wedge is rocked in a counter-clockwise direction until the lower edge thereof engages both rollers 36. The piston 31, which might become bound within the cylinder by a rocking motion out of the longitudinal axis thereof, is not affected by the pivotal movement of the wedge. As a further precaution against binding, the piston 31 is given a loose fit within the cylinder. The action of the conventional leather cup 40 at the rear of the piston assembly is not affected, this element continuing to prevent the seepage of air around the piston.

It will further be noted that because of the engagement of the outer end of the piston rod 32 with the bottoms of the recesses 38, the thrust of the piston 31 during the compression stroke is taken directly by the wedge and not indirectly through the rivet 39. This makes for a sturdy construction since the rivet 39 is relieved of all loads except the very light strain involved in carrying the wedge rearwardly during the return stroke. In similar devices of the prior art the thrust of the piston against the flexibly supported wedge is borne entirely by a transverse rivet or bolt which can be broken by the powerful forces acting upon it.

The piston assembly is shown in Fig. 3 at the end of the working or compression stroke with the movable jaw 21 in fully actuated position. Return of the piston assembly is accomplished by spring pressure. Referring particularly to Figs. 4 and 5 it will be seen that there is secured to the piston 31 a pair of guide rods 42 paralleling the central piston rod 32 and positioned on opposite sides thereof. The rods 42 further lie on opposite sides of the arms 28 of the stationary jaw and are received in respective cut-out portions or pockets 43 formed in the interior of the housing 20 (see also Figs. 7 and 11). Surrounding each of the rods 42 and interposed between the piston and the bottom of a respective pocket 43 are two springs 44 and 45. The springs of each pair are arranged in telescoping relation, the inner spring being wound in a direction opposite to that in which the outer spring is wound to minimize the possiblity of interference. The sets of springs 44 and 45 are compressed as the piston assembly moves forwardly on the working stroke and serve to return the assembly to initial operative position when the application of pressure to the rear face of the piston 31 is discontinued. The guide rods 42 prevent springs 44 and 45 from buckling when under compression.

In order that the movable jaw 21 may be fully responsive to the movement of the piston assembly, it is urged by a spring 46 (Figs. 3, 7 and 11) in a direction to maintain the follower roller 37 in contact with the inclined surface 33ª of the wedge 33. The spring 46 is a conventional leaf spring mounted at one end on a transverse pin 47 supported in the housing just to the rear of the inner end of jaw 21. The free end of the spring contacts the movable jaw in advance of the roller 37 and presses the jaw downward in a clockwise direction as viewed in Fig. 3. Thus, as the wedge 33 is withdrawn rearwardly the movable jaw 21 is rocked about the bolt 29 toward open position.

Tools of this kind are frequently used in assembly operations in which the tool is moved rapidly from one to another of a series of closely spaced working positions of the same character; for example, long lines of rivets of the same size and type such as are used to secure a metal skin covering to the wings and fuselage of airplanes. It is unnecessary in this work for the movable jaw 21 to open to its maximum gap before applying the tool to the next rivet. It is, in fact, desirable to shorten the gap between the jaws to permit the operator to align the dies 26 and the rivet with greater ease and facility. Therefore, a means is provided for controlling the return movement of jaw 21 independently of the wedge 33. Referring to Figs. 3, 8, 9 and 10, the auxiliary control means resides in a short stroke mechanism comprising essentially a latch 48 supported between the stationary jaw arms 28 and engageable with a downwardly projecting finger 49 formed on the movable jaw 21. The latch 48 is loosely mounted on a transverse pin 51 and is formed as a bell crank lever, one arm of which is disposed adjacent the finger 49 and the other arm of which extends outside the housing through a plate 52 closing the bottom area of the bifurcated front end portion of the housing. The latch 48 is pressed toward effective position relative to the finger 49 by a torsion spring 53 surmounting the pin 51. The spring 53 has a bail-shaped portion underlying the latch 48 and a free anchor end abutting against another cross pin 54 below and forwardly of the cross pin 51. The pin 54 is also contacted by a shoulder 48ª on the latch 48 and serves to hold the latch 48 normally out of effective position against the tension of spring 53. The pin 54 is supported between the arms 28 of the jaw 22 for axial movement transverse to the longitudinal axis of the tool and relative to the latch 48. The latch 48 is held against similar transverse movement along pin 51 by the oppositely disposed coils of spring 53 lying between the latch and the arms 28 (see Figs. 8 and 10). The pin 54 is formed with a cut-out portion 55 for the free anchor end of spring 53, and with a second cut-out portion or notch 56 adapted to receive the shoulder 48ª of latch 48. When the cross pin 54 is positioned as shown in the drawings, the notch 56 is out of alignment with the shoulder 48ª and the latch is held disabled or ineffective. Under this condition of operation, the movable jaw 21 is permitted a full stroke to wide open position upon withdrawal of the wedge 33. To initiate short stroke operation the pin 54 is moved rightwardly, as viewed in Fig. 8 (toward the operator's left), to bring the notch 56 opposite the shoulder 48ª. This movement permits the latch 48 to swing upward into the path of finger 49, latch shoulder 48ª entering notch 56 and locking the cross pin against further movement. With the latch 48 so positioned the movable jaw 21 is limited in its return movement to a travel less than a full return stroke. When it is desired again to disable the latch 48 the outwardly projecting arm thereof is grasped manually and the latch thereby pulled out of cooperative relation with the finger 49. Such movement releases the cross pin 54 which may now be returned leftwardly (Fig. 8) to lock the latch again in ineffective position. The cross pin 54 is manually operated and is of such length that one or the other of its opposite ends lies outside the jaw 22 in each of its set positions.

Figure 13:
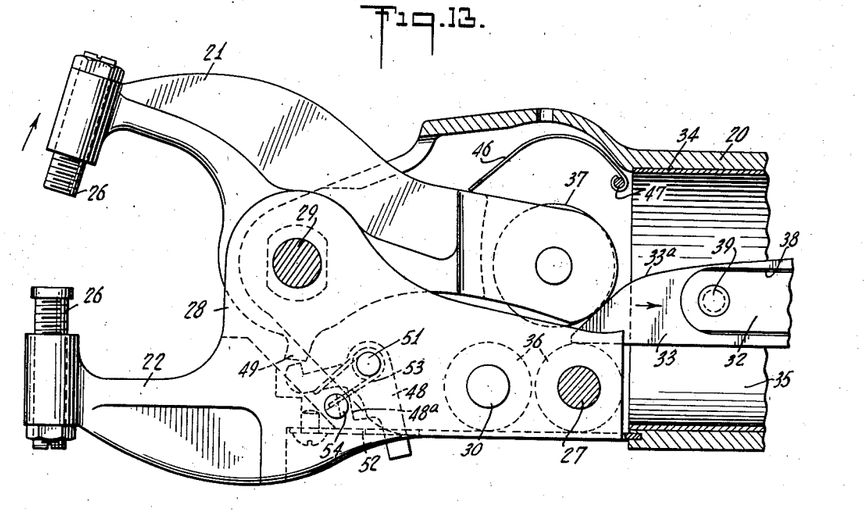
Fig. 13 is a fragmentary view, in longitudinal section, showing the piston assembly fully retracted and the movable work engaging jaw in wide open position, the short stroke mechanism being set to disabled or ineffective position.
Figure 14:
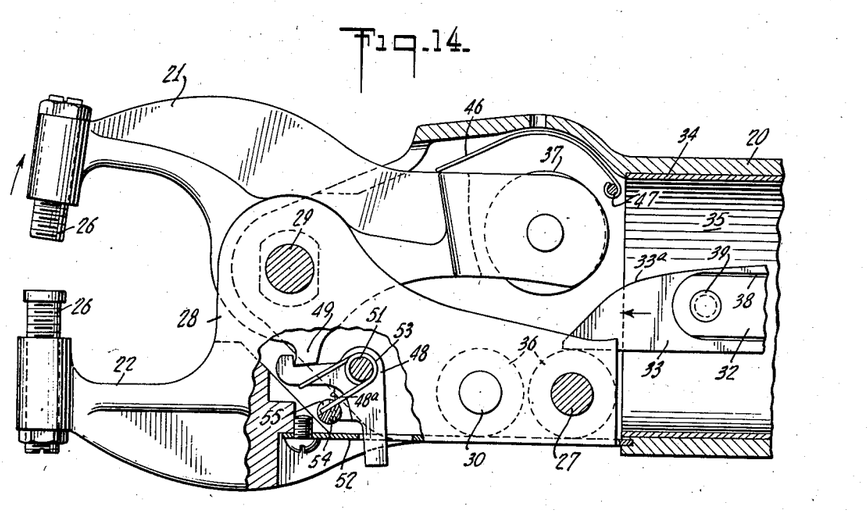
Fig. 14 is a view similar to Fig. 13 showing the short stroke mechanism in effective position, the movable jaw being now held to a portion of its travel to wide open position.
Figure 15:
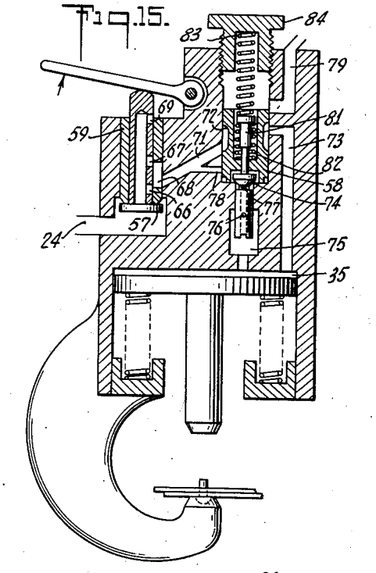
Figs. 15-18 are diagrammatic views of the tool showing particularly the automatic valve mechanism in respective stages of a rivet setting operation.
Figure 16:
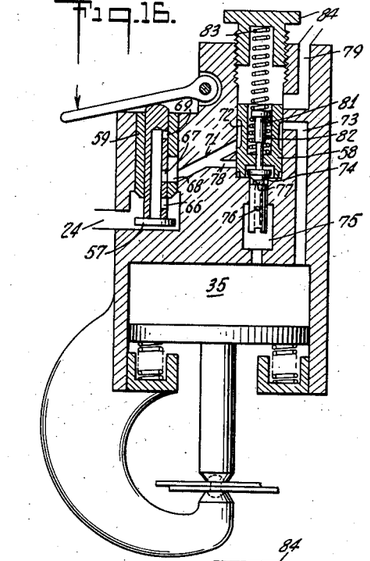

Figs. 13 and 14 are position views, showing the wedge 33 retracted and showing respectively the latch 48 ineffective and effective. Thus in Fig. 13 the movable jaw 21 is permitted a full return stroke under the pressure of spring 46. In Fig. 14 the jaw 21 is engaged by the latch 48 when it has completed approximately half the return stroke, and is held in this, its short stroke, position.

Figure 2:
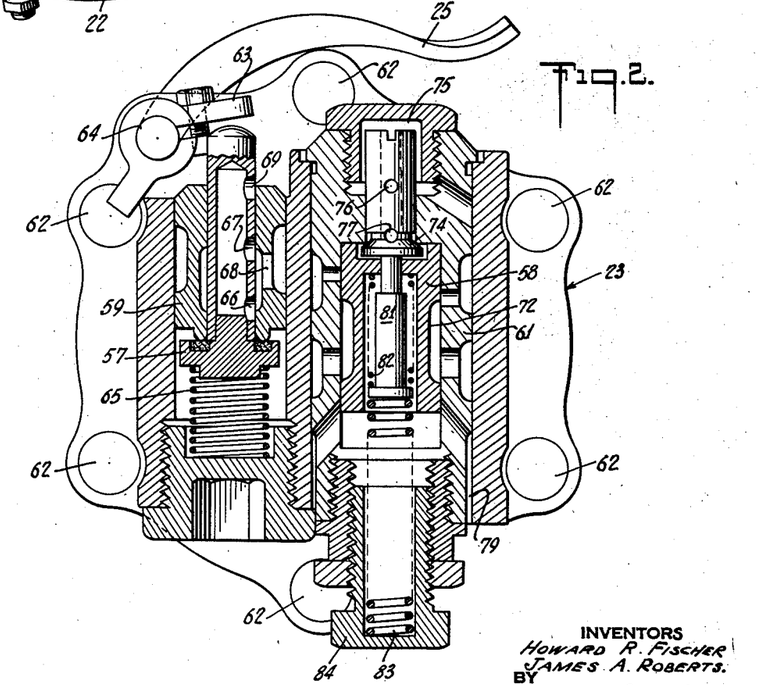
Fig. 2 is a view, in cross section, of the valvular control mechanism of the tool, and is taken substantially along the line 2—2 of Fig. 3.

As previously mentioned, the supply of pressure fluid to the compression chamber 35 is controlled by a valve assembly embodied in the backhead 23. As shown in Fig. 2, two elements of this assembly are a throttle valve 57, and a distributing valve 58, mounted for reciprocating movement within respective bushings 59 and 61 positioned in vertical bores in the plate 23. The throttle valve 57 closes the lower end of bushing 59 and has a stem extending upwardly through and beyond the bushing, the upper end of the valve stem projecting outside the plate 23. It will be observed that the back-head 23 is formed with a flange corresponding in shape to the rear of housing 20 and secured directly to the housing by screws 62, and that the valve mechanism is embodied in a rearwardly projecting portion of the plate reduced in diameter relatively to the flange thereof. Overlying the projecting upper end of the throttle valve is an arm 63 secured to the rear end of a rock shaft 64. The front end of the shaft 64 constitutes the previously described lever or finger piece 25, the shaft being disposed in a longitudinal bore within the housing 20, and extending beyond the bore at both ends thereof. The shaft 64 passes through and beyond the flange on plate 23 and terminates adjacent the throttle valve 57. The finger piece 25 lies over the front end of the housing 20, substantially at right angles to the shaft 64. Upon depression of the finger piece the shaft 64 is rocked in a clockwise direction (Fig. 2), causing the arm 63 to engage and unseat the throttle valve 57. A spring 65 holds the valve 57 normally in closed position and serves to return both the valve and its actuating means when finger piece 25 is released.

A better understanding of the compressed air distributing system may be had by reference to the diagrammatic views, Figs. 15—18. For the sake of convenience of illustration, the position of the distributing valve 58 and associated control elements is reversed in these views, while the forward end of the tool is shown as a simple yoke type rivet setting mechanism. The compressed air inlet 24 communicates with the space below throttle valve 57, and, upon depression of the valve (Fig. 16) air may flow to the interior of the hollow valve stem through a port 66 therein. A second port 67 in the valve stem is brought to registry with a bushing port 68 by opening movement of the throttle valve, while a third port 69, normally open to atmosphere, is closed. Bushing port 68 is connected to a passageway 71 leading to distributing valve 58. Passageway 71 is in turn connected around a peripheral groove 72 in valve 58 to a passage 73 opening directly into the compression chamber 35. Thus, opening of the throttle valve 57 serves to establish communication between the pressure fluid supply line and compression chamber 35, thereby initiating a working stroke of the piston assembly. In the closed position of the throttle valve (Fig. 15), chamber 35, supply passages 73 and 71, and the interior of the throttle valve stem are opened to exhaust through port 69 which is at this time positioned above the bushing 59.

Tools of this class customarily provide means for terminating automatically the working stroke of the piston assembly when the air pressure within the piston chamber reaches a predetermined height, say 90 pounds per square inch. In this manner the same pressure, for example 3,000 pounds, may be applied to each of a series of rivets, and the pressure capabilities of the tool may be modified to meet the requirements of each size and type of rivet. Control means of an improved character is provided in the present tool for this purpose.

Figure 17:
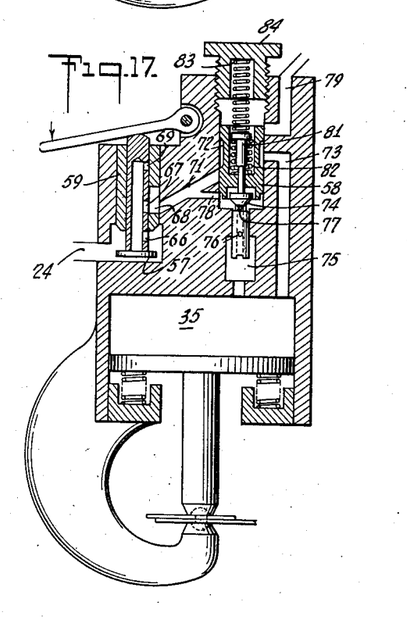
Figure 18:
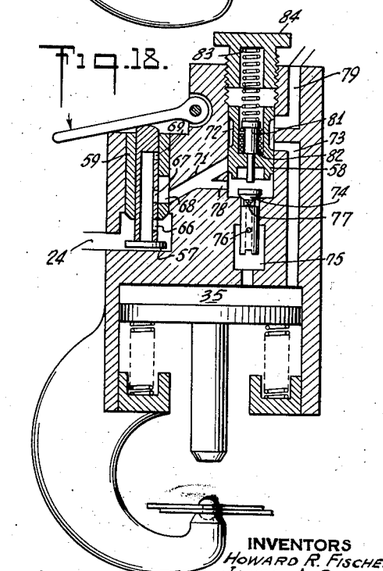

The distributing valve 58 is movable vertically to the partly and fully actuated positions of Figs. 17 and 18, in both of which positions the peripheral groove 72 of the valve is placed out of registry with the passage 71. Communication between passages 71 and 73 is thereby cut off and the supply of pressure fluid to the chamber 35 is discontinued, even though the throttle valve 57 is held open. The distributing valve 58 is shifted from the normal position of Figs. 15 and 16 by means including a control element 74, which is positioned co-axially of the valve 58 and, as shown in Fig. 2, is formed as a piston slidably mounted within a reduced neck of the distributing valve bushing 61. The element 74 has a valve-like head seated against one end of the said neck and a stem or body portion of reduced diameter extending through the neck into a chamber 75 communicating with the compression chamber 35. A pair of longitudinally spaced ports 76 and 77 in the element 74 provide for the entry and exit of air to and from the hollow stem thereof. The port 77 is positioned just below the valve head (according to the diagrammatic views), while the outwardly positioned port 76 normally lies within the chamber 75. When the pressure within the chamber 35, as communicated through chamber 75 to the lower end of piston valve 74, rises to a sufficient height the piston element will be shifted axially to the position shown in Fig. 17. The head of element 74 lies adjacent one end of the distributing valve 58 and the above described axial movement of the control element opens port 77 therein to permit air from compression chamber 35 to move the distributing valve to the partly and fully actuated positions of Figs. 17 and 18. In moving to the partly actuated position of Fig. 17, the valve 58 interrupts the supply of pressure fluid to the chamber 35, but the chamber is not yet connected to exhaust. This initial movement of the valve 58 is caused to open a branch 78 of the supply passage 71 by which live air is directed to that end of the distributing valve adjacent the element 74. Under the combined pressures of the air from chamber 35 and branch passage 78, the distributing valve is caused to complete its movement to fully actuated position and, as shown in Fig. 18, then vents the chamber 35 through passage 73 which is now connected around groove 72 to an exhaust passage 79. In response to this operation the piston assembly within housing 20 begins its return stroke and accomplishes such movement without encountering the resistance of trapped air in back of the piston.

Actuation of the pressure-relief control element 74 is opposed by a plunger 81 mounted for axial movement within the distributing valve 58 and controlled by a pair of oppositely disposed compression springs 82 and 83. The spring 83, of greater strength than the spring 82, presses the control element toward seated position and has a base in an adjustable nut 84. Through manipulation of the nut 84 the pressure of the spring 83 may be increased and decreased and corresponding changes thereby made in the resistance to actuation of the piston 74. It will be noted that the air supplied through branch passage 78 for shifting the valve 58 to fully actuated position acts also to return the control element to seated position. The escape of live air through the ports 77 and 76, while the distributing valve is held actuated, is thus prevented. When the throttle valve 57 is returned to closed position branch passage 78 is disconnected from the pressure fluid source and the distributing valve permitted to return to normal through the coaction of springs 82 and 83. Passage 78 and communicating areas are at this time vented through throttle valve stem port 69.

The operation of the pressure relief valve 74 and the distributing valve 58 is as follows: During the power stroke, when pressure builds up in the work cylinder 35 and against the lower end of the relief valve 74, to a point slightly greater than the tension of the control spring 83, the relief valve 74 is lifted off its seat, allowing live air to flow through ports 76 and 77 to act against the lower face of the distributing valve 58 to move it to its upper position, as illustrated in Fig. 18. With the distributing valve in its upper position, the pressure in the work cylinder 35 instantly drops to near the zero point, and as pressure is removed from the lower face of relief valve 74, it is closed by pressure acting on its upper face, but the distributing valve 58 is held in its upper position by live air supplied through ports 66, 67, 68 and 78. However, when the source of live air is cut off from the above ports by the throttle valve, the distributing valve 58 is carried through part of its return stroke by the control spring 83 and through the balance of the stroke by the lighter spring 82. The purpose of this light coil spring 82 is to allow the pressure relief valve 74 to open against the tension of the control spring 83 only, thereby eliminating all friction due to the close working fit of the distributor valve. The cylindrical portion of the pressure relief valve 74 having a rather loose fit in its bearing, friction is reduced to a minimum. Such reduction of friction prevents wide variations in the final pressure and makes possible uniform results in driving rivets.

What is claimed is:

1. In a riveting or like machine, the combination of a stationary work engaging jaw, a movable jaw supported for movement toward and away from said stationary jaw to complete a compression and return stroke, actuating means for moving said movable jaw toward said stationary jaw and for controlling the movement thereof away from said stationary jaw, an independently operable latch movable to different positions so as to be cooperable with said movable jaw effective to limit the travel of said movable jaw away from said stationary jaw to a movement less than a full return stroke, and settable means for enabling and disabling said latch.

2. In a riveting or like machine, the combination of a stationary jaw bifurcated at one end to form a pair of projecting arms, a movable jaw supported between said projecting arms for relative oscillating movement, a latch mounted between said projecting arms and cooperable with said movable jaw to limit movement thereof in one direction, said latch being settable to effective and ineffective positions, means settable to effective and ineffective positions for holding said latch ineffective, and an interlock between said latch and said holding means by which said latch is held ineffective in the effective position of said holding means and said holding means is locked against movement in the effective position of said latch.

3. In a riveting or like machine, the combination of a substantially cylindrical housing, a stationary work engaging jaw having its inner end rigidly secured within said cylindrical housing, a movable jaw supported within said housing for oscillating movement relative to said stationary jaw, one of said jaws being bifurcated to form projecting arms receiving the other of said jaws, an independently operable latch supported by said stationary jaw and cooperable with said movable jaw to limit movement thereof in the opening direction, and settable means for enabling and disabling said latch.

4. In a riveting or like machine a stationary jaw, a movable jaw, power means including a wedge for moving the movable jaw toward the stationary jaw and into operative relation thereto, retracting means for actuating the movable jaw on its return stroke away from the stationary jaw and out of operative relation thereto, an abutment carried by the movable jaw during its return stroke, a latch pivoted for movement into and out of the path of said abutment for selectively limiting the return movement of the movable jaw, spring means tending to hold the latch in one position of adjustment, and positive means including a manipulative element for overcoming said spring means for moving and holding the latch in the other position of adjustment.

HOWARD R. FISCHER.
JAMES A. ROBERTS.